United States Patent [19]

Vadasz et al.

[11] Patent Number: 4,718,617
[45] Date of Patent: Jan. 12, 1988

[54] SPINNING REEL WITH ACCELERATION-CONTROL MECHANISM TO PREVENT REVERSE ROTATION

[75] Inventors: Jozsef Vadasz; Gyorgy Szecsenyi; Jozsef Drescher, all of Budapest, Hungary

[73] Assignee: Magyar Optikai Muvek, Budapest, Hungary

[21] Appl. No.: 907,068

[22] Filed: Sep. 12, 1986

Related U.S. Application Data

[63] Continuation-in-part of Ser. No. 834,621, Feb. 28, 1986, abandoned, which is a continuation-in-part of Ser. No. 510,450, Jun. 10, 1983, abandoned.

[30] Foreign Application Priority Data

Oct. 19, 1981 [HU] Hungary ............................. 3031
Oct. 19, 1982 [WO] PCT Int'l Appl. .................... PCT/HU82/00054

[51] Int. Cl.⁴ ............................................. A01K 89/02
[52] U.S. Cl. ........................ 242/84.2 G; 242/84.52 C
[58] Field of Search ............... 242/84.52 C, 219, 299, 242/84.26; 254/267; 188/184

[56] References Cited

U.S. PATENT DOCUMENTS

| 1,566,594 | 12/1925 | Graham | 242/84.52 C |
| 1,971,470 | 8/1934 | Watson | 242/84.52 C |
| 2,055,358 | 9/1936 | Maynes | 242/84.52 C |
| 2,713,463 | 7/1955 | Sarah | 242/84.21 R |
| 3,171,609 | 3/1965 | Baenziger | 242/84.52 C |
| 3,477,659 | 11/1969 | Morritt | 242/84.52 C |

FOREIGN PATENT DOCUMENTS

| 5531 | of 1914 | United Kingdom | 242/84.52 C |
| 36090 | 4/1934 | U.S.S.R. | |
| 248371 | 12/1969 | U.S.S.R. | |

Primary Examiner—Stuart S. Levy
Assistant Examiner—Katherine Matecki
Attorney, Agent, or Firm—Karl F. Ross; Herbert Dubno; Ronald Lianides

[57] ABSTRACT

A spinning-type fishing reel whose rotor is formed with weights which, upon a predetermined combination of reverse angular velocity and acceleration of the rotatable line guide mounted on the rotor, jam against a nonrotatable part of the reel and thereby prevent further rotation. The locking of the rotary part is important, since it prevents entrainment of the rotary part in reverse rotation when the angler neglects to lock this part prior to the setting of a hook in the fish.

12 Claims, 10 Drawing Figures

SPINNING REEL WITH ACCELERATION-CONTROL MECHANISM TO PREVENT REVERSE ROTATION

CROSS REFERENCE TO RELATED APPLICATION

This application is a continuation-in-part of our copending application Ser. No. 834,621 filed Feb. 28, 1986 (now abandoned) and, in turn, a continuation-in-part of application Ser. No. 510,450 filed June 10, 1983 (now abandoned). That application was a National Phase application corresponding to PCT/HU82 /00054 filed Oct. 19, 1982 and based, in turn, upon Hungarian National application No. 3031/81 of Oct. 19, 1981 under the International Convention.

FIELD OF THE INVENTION

Our present invention relates to a spinning-type fishing reel and, more particularly, to a spinning reel of the type in which the setting of the hook tends to impart an angular displacement to a line-guide member mounted on a rotatable rotor of the reel.

BACKGROUND OF THE INVENTION

A fishing reel of the spinning-reel type generally comprises a support structure which can be mounted on the rod, a line-guide member which is mounted upon a rotor mounted on the support for rotation about an axis and includes a bail which can be swung between a casting position and a line takeup position, a mechanism including a crank for rotating this guide member when the bail is swung into the line takeup position, and a spool which is generally fixed on the support, but may be capable of some rotation relative thereto upon excessive loading.

In the operation of such a reel, a line which is wound on the spool is permitted to pass freely over the end of the spool when the bail has been swung into its casting position so that the line can be cast freely by the angler without impediment and the rotatable guide can remain stationary.

For line takeup, the bail is swing into its line-takeup position which guides the line into the reel laterally and the rotating guide member is rotated by the crank to wind the line on the stationary spool.

A brake can be provided between the spool and the support to permit some rotation of the spool when an excess load is placed on the line and the brake force is overcome.

Generally, to set the hook in a fish which may have taken the bait, one immobilizes the rotating member and draws back on the rod with a reasonably sharp motion serving to lodge the hook in the fish.

However, if the angler should fail to restrain the rotary motion of the guide, the hook-setting action may cause line to be drawn-off along the guide and rotation of the guide in the reverse direction, i.e. the direction opposite that in which the guide is rotated to take-up the line.

The reverse direction of rotation of the guide usually entrains with it the entire drive and the crank, a mechanism with considerable inertia so that, when the hook-setting action is terminated by the angler, the inertia of the rotating guide, crank and drive may cause additional line to be unwound from the spool and create a problem with tangling, jamming of the moving parts and even loss of the fish. The recovery from this state can be time consuming and annoying to the angler, can result in a loss of line, and can even require disassembly of the reel.

In more general terms, a fishing reel can be understood to allow winding-up of the fishing line by rotating a drive arm in a counter-clockwise direction (if the drive arm is arranged on the left-hand side) while winding out of the line once the bail has been swung back from its casting position, is performed by winding the drive arm in a clockwise direction.

A mechanism, e.g. a ratchet, for preventing motion in the reverse unwinding direction, can be found in every fishing reel, the mechanism producing either a rasping noise or, no sound at all. Fishing reels are also known in which prevention of the reverse unwinding motion is controlled by a three-way selector switch. By means of this switch, three modes of operation can be selected:

Position 1: winding-up is allowed and is performed noiselessly; unwinding is likewise allowed.

Position 2: winding-up is allowed and is performed noiselessly; reverse motion is prevented.

Position 3: winding-up is allowed and generates a rasping sound; reverse rotation is prevented.

The method of inhibiting reverse rotation and hence the switch mechanism for locking the rotating guide against reverse rotation performs a very important function, namely, that of preventing line from drawing off the spool when the angler jerks the rod back to embed the hook in the mouth of the fish. Should line be released from the spool at this point, the line running to the fish would not be subject to the jerking action or force, but rather this jerking action would merely draw additional line from the spool.

However, frequently, the angler fails to set the switch to prevent reverse motion or rotation of the bail arm and the line guide in the reverse direction.

This can be because the angler has released the switch, because he wished to step back with his rod without pulling the line backward or, the line running into the water has been overstretched and the angler wishes to loosen it, or the angler wants to increase the slack of the line to signify the taking of the bait when the line is drawn taut. Under such circumstances, even the most experienced angler may neglect to reset the switch to prevent reverse rotation.

Consequently, the backward movement of the rod for setting of the hook may cause the stretching of the line and the elastic end of the fishing rod to bend, thereby causing the guide to rotate in the reverse direction and line to pay-off from the spool with all of the drawbacks enumerated above.

OBJECTS OF THE INVENTION

It is, therefore, the principal object of the present invention is to provide an improved spinning reel which will eliminate this problem.

Another object of the invention is to provide an improved spinning reel which has a mechanism for automatically preventing the reverse motion described above at the critical point with respect to angular velocity and any acceleration of the rotary guide of the spinning reel.

Still another object of our invention is to provide an improved reel which facilitates setting of the hook without the danger of line entanglement, even if the switch for preventing reverse motion has inadvertently not been set by the angler.

It is also an object of the invention to extend the principles of the above-identified applications outlined above.

SUMMARY OF THE INVENTION

These objects and others which will become apparent hereinafter are attained in accordance with the present invention in a fishing reel, namely, a spinning reel as described which comprises a rotor provided with a rotatable line-guide member for winding line onto and off of the spool, a support forming a stator, a drum mounted on the support and a body that is so mounted on the rotor that it moves toward the drum, both under the influence of centrifugal force when the rotor is in the reverse winding-out direction of the line and also under the influence of an inertial force acting on the body through the center of mass thereof in a tangential direction when the rotor is accelerated in this reverse direction, a spring acting on the body to bias the body away from the drum, and the arrangement being such that when the rotor is rotated in the reverse direction with a critical combination of angular velocity and angular acceleration, the body engages the drum and jams against the drum preventing further rotation in this one direction.

It has been found that while centrifugal force plays a roll in contributing to the engagement of the body with the drum, under the circumstances in which the invention is principally applicable, i.e. when the hook is to be set in the mouth of a fish, the angular velocity is usually comparatively low, since generally the hook-setting action takes place more or less suddenly when the rotating member is practically at a standstill.

However, the hook-setting action provides a very significant angular acceleration so that the dominant component of the combination may be the inertia which causes the body to lag behind the rapidly accelerated rotation of the rotor and thereby to engage the drum. The direction in which the body frictionally engages the drum is selected so that the friction itself tends to wedge the body further into engagement with the drum in the self-locking action or jamming action described.

In one embodiment, the body is pivotally mounted on the rotor, a stop pin is mounted on the rotor to limit the movement of the body under the bias of the spring and the body includes a friction lining for engagement with the drum. The lining is arranged ahead of the pivot of the body when the rotor is turning in the reverse direction so on engagement of the lining with the drum, the momentum of the rotor causes the lining to be urged further towards the drum thereby jamming the body against the drum and preventing further movement in this reverse direction.

Alternatively, the body can be held by the spring in a keyway in the rotor in which the body can move, one edge of this keyway being located behind the body when the rotor is turned in the reverse direction and being inclined to provide a tapering space between it and the drum. In this arrangement, on engagement between the body and the drum when the rotor is rotated in the reverse direction, the body is jammed in the tapering space between the drum and the keyway edge, thereby preventing the rotor from moving further in the reverse direction.

SPECIFIC DESCRIPTION

Figure 1:
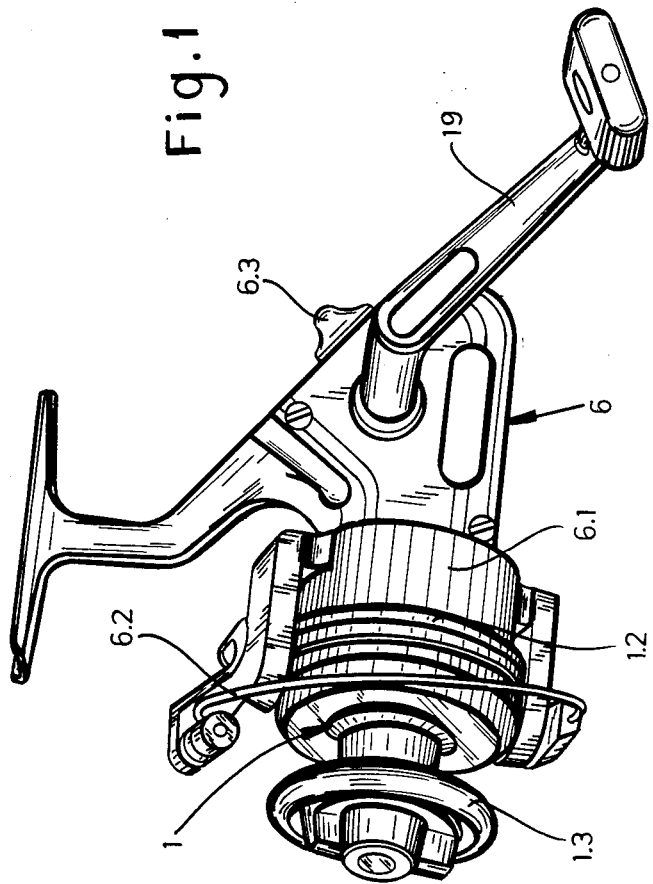
FIG. 1 is a perspective view of a spinning-type fishing reel according to the invention.

FIG. 1 shows a fishing reel of a type embodying the invention, the reel comprising a support 6 on which a generally stationary spool 1 is mounted and from which the line can be cast-off generally axially, i.e. over the rim 1.3 of this spool. A bail 6.2 is swingable from the line takeup position shown in FIG. 1 into the casting position in the usual manner and is provided on a rotor 6.1 rotatably mounted on the support 6 so that it can be driven by a crank 19. The switch referred to earlier has been shown at 6.3 in FIG. 1.

The support 6 is shown to carry a drum 2 which is stationary with respect to the rotor 6.1. The reel automatically inhibits motion in one direction, i.e. the direction A of the rotor 6.1, this direction being referred to as the reverse direction and the motion which is thus inhibited being referred to as the reverse motion. This direction of rotation is the direction in which the rotor 6.1 is rotated by line drawn off of the spool 1 when the bail 6.2 is in its takeup position. This automatic inhibition is achieved by two flyweights 4 each provided with a friction lining 5 and mounted on a pivot 3 of the rotor 6.1.

Figures 5, 6:
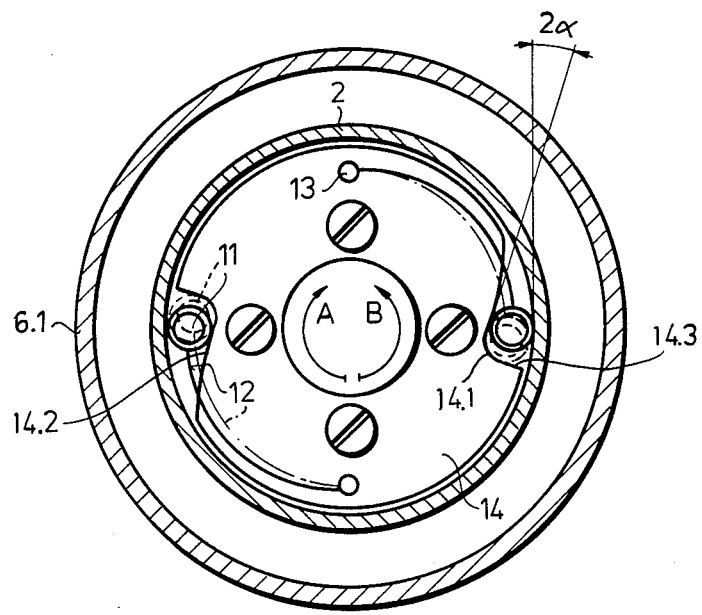
FIG. 5 is an axial cross-sectional view of a second embodiment the invention.
FIG. 6 is a section taken along the line VI—VI of FIG. 5.
Figure 7:
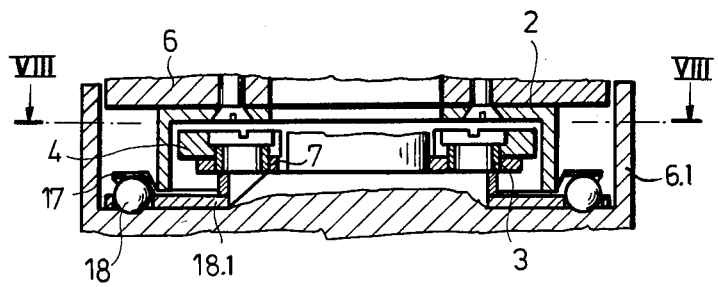
FIG. 7 is an axial cross-sectional view of a third embodiment.
Figure 8:
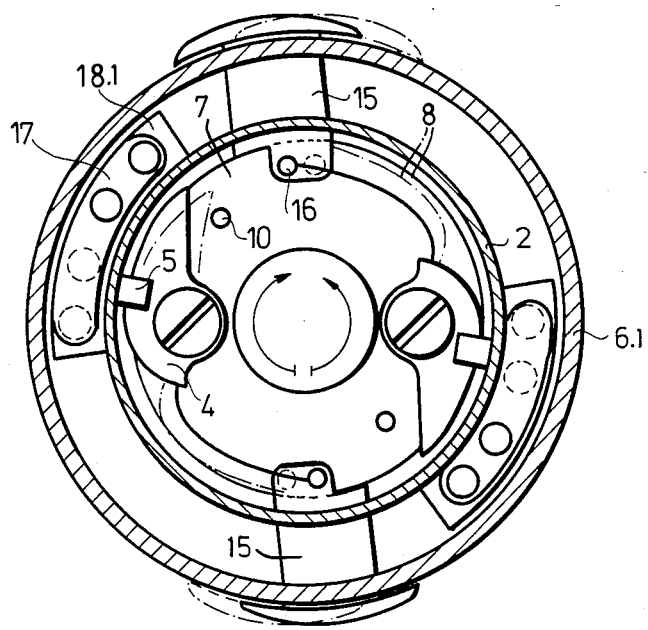
FIG. 8 is a section taken along the line VIII—VIII of FIG. 7.
Figures 9, 10:
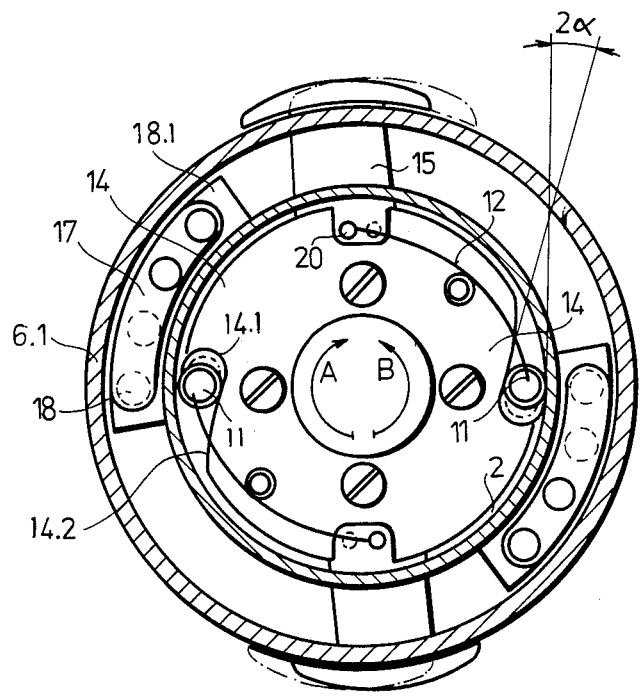
FIG. 9 is an axial section through a fourth embodiment of the invention.
FIG. 10 is a section taken along the line X—X of FIG. 9.

When the reel is at a standstill, the flyweights are urged against detent pins 10 by means of springs 8, shown in the drawing to be of the leaf type. The drum 2 is, as has been noted, stationary because it is fixed on the support of the reel. FIGS. 5 and 6 show another construction which, however, acts similarly and is advantageous by having a greater useful life. Here, instead of the flyweights 4, roller flyweights 11 are used and are kept in a respective keyway in a base plate 14 by flyweight springs 12. The positions of the springs and the rollers when they are engaged has been indicated by a broken line in the drawing. The springs 12 are fixed on the base plate 14 by pins 13. In a further embodiment seen in FIGS. 7 through 10, as will be described in greater detail later, selector arms are provided for selecting the mode of operation between a first mode in which rotation in the clockwise direction A, as seen in the drawing, is inhibited when rotation in that direction reaches critical values of angular velocity and acceleration and a second mode in which any rotation of the rotor in that direction is completely prevented, i.e. the critical value of velocity and acceleration are 0.

The two stable positions of the selector arms 15 are ensured by means of arrestor springs 17 which acts on balls 18 to bias them into one of two alternative nests formed in plates 18.1. The arms 15 carry spring pins 16 and 20 respectively, which bias the flyweight springs 8, 12 to different extents depending on the position of the selector arms.

Figure 2:
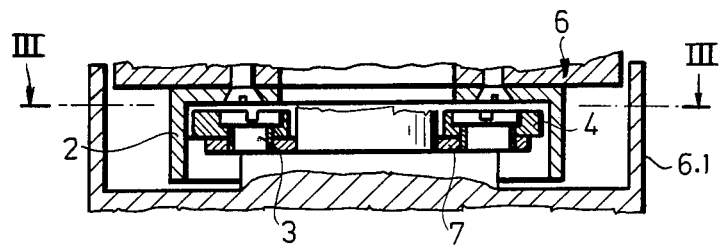
FIG. 2 is an axial sectional view of a reverse-motion acceleration responsive blocking device for this reel.
Figure 3:
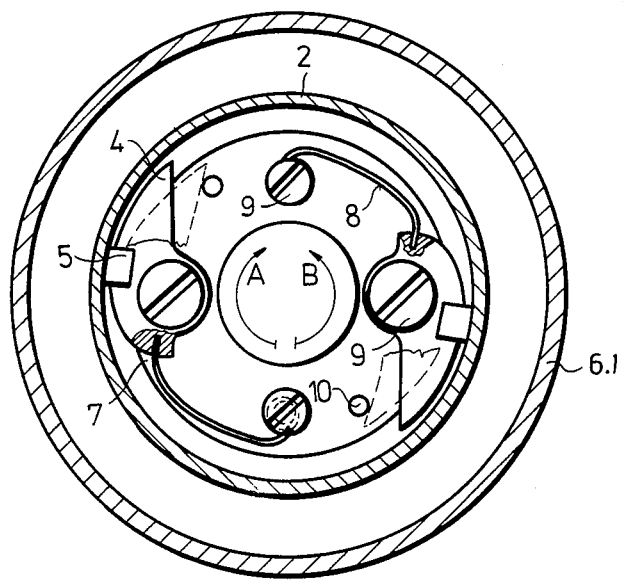
FIG. 3 is a section taken along the line III—III of FIG. 2.

The mechanism according to the invention operates as follows: in the embodiment of FIGS. 2 and 3 when the rod is jerked back to embed the hook in the mouth of the fish, i.e. for setting of the hook, and the switch 6.3 does not impede reverse motion because it has inadvertently not been properly set, the rotor 6.1 rotates in the reverse direction A and the base plate 7 accelerates while the flyweights are practically at a standstill. The plate 7 quickly reaches the critical point of angular velocity and angular acceleration, e.g. before more than a total of 5 cm of line has been wound off of the reel, to jam the linings 5 against the stationary drum 2.

The angular velocity of base plate 7 and of weights 4 causes a centrifugal force to act on the weights. Furthermore, as the base plate 7 is accelerated in direction A, the inertia of the previously stationary weights causes a tangential force to act on the weights. This tangential force acts, in effect, on the center of gravity of each weight and, therefore, tends to pivot the weights about pins 3 in an outward direction, i.e. towards the drum 2.

Figure 4:
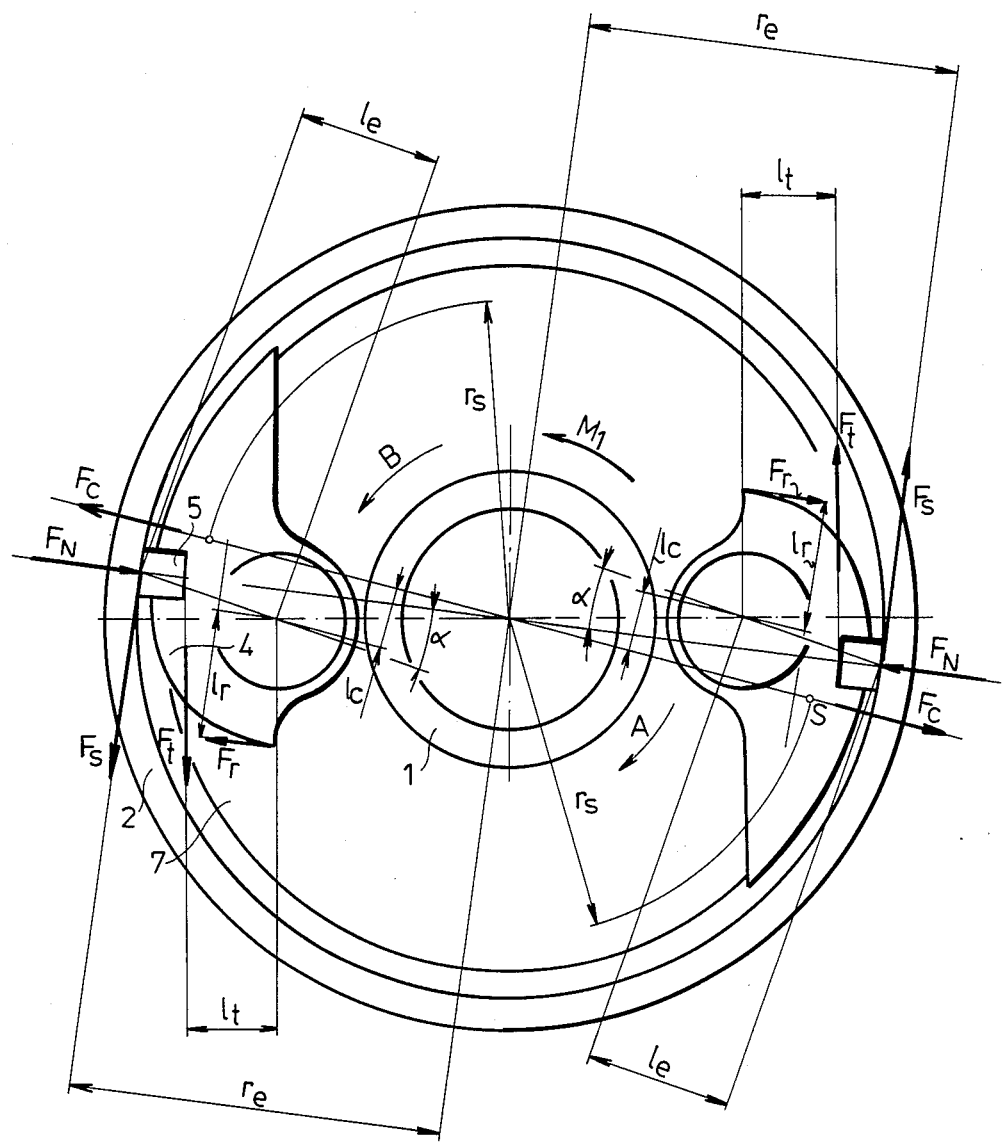
FIG. 4 is a diagrammatic view of FIG. 3 showing the angular relationships of the elements thereof and the forces acting thereon.

The centrifugal and tangential forces acting on the flyweights overcome the force of the springs 8 and consequently, the flyweights 4 pivot about pins 3 so that the friction linings 5 approach the inner surface of the stationary drum 2. When the linings 5 contact the drum 2, if the angle according to FIG. 4 is properly chosen, the flyweights are wedged instantly between wall 2 and pins 3, thereby jamming the rotating components and bringing the spool to a standstill. If the spool is rotated in the counter clockwise direction B, the jamming does not occur.

In an expedient manner, the mechanism according to the invention, is so dimensioned that at very low acceleration values, the critical value of angular velocity of the rotor should be about 2–3 revolutions per sec; with values lying below that value, fishing line can be wound out by means of the drive arm of the reel without activating the automatic jamming mechanism.

The embodiment shown in FIGS. 5 and 6 operates as follows:

The roller flyweights 11 are held by the flyweight springs 12 and under the influence of (a) increasing centrifugal forces arising from the rotation of the weights 11 and (b) tangential forces arising from the inertia of the weights 11 on acceleration of the weights as described above, the weights 11 move from the bottom 14.3 of the keyway 14.1 in the base plate 14 towards the drum 2, against the action of springs 12. If rotation is in the clockwise direction, the flyweights 11, on reaching the inner surface drum 2, are immediately jammed between the following inclined surface 14.2 of the keyway 14.1 and the drum 2. Rotation of the spool in the counter-clockwise direction does not give rise to such jamming, since the corresponding surface 14.3 of the keyway is inclined at about 90° to the adjacent surface of the drum 2.

In FIGS. 7 to 10 further preferred embodiments are shown in which the previously illustrated embodiment of FIGS. 1, 2, 5 and 6 are provided with selector arms 15 for the selection of one of two modes of operation, by means of which rotation in the clockwise direction can be stopped either when the angular velocity and acceleration reach a critical value (the automatic mode) or instantly when the rotating part 6.1 starts to move in the clockwise direction (the instant mode). In both cases, the spring pins 16, 20 arranged on the selector arms 15 position the flyweight springs 8, 12 to maintain the flyweights 4 and 11 in a desired position with respect to drum 2. In the automatic mode of operation, the selector arm 15 keeps the distance between the flyweights 4, 11 and the drum 2 by means of the flyweight springs 8, 12; the flyweights can only reach the wall under the influence of sufficiently high centrifugal and tangential (inertia) forces corresponding to the critical velocity and acceleration values of rotating part 6.1. In the instant mode, the springs 8, 12 hold the flyweights against wall 2 and surface 14.2 of keyway 14.1 so that they jam on the instant that clockwise rotation begins.

As is apparent, the reel of the prsent invention prevents tangling of the fishing line which means, that it is not liable to damage, time-consuming reassembly is avoided and, last but not least, a fish, once caught, is not lost.

The construction has several other advantages, e.g. it has a very simple design and it operates noiselessly in the course of winding in.

The forces and moments arising in the course of the operation of the mechanism for the automatic prevention of rotation in one direction as well as their calculation and correlations will now be discussed with reference to FIG. 3.

The rotating part 6.1 carrying the flyweights 4 and the base plate 7 can rotate in the direction 'B' without hindrance. However, if the driving movement $M_f$ causes rotation in the direction 'A' above a critical pair of values of angular velocity and acceleration $\alpha - \epsilon$, the flyweights 4 overcoming the spring forces pivot.

In the instant before the contact between the friction lining 5 and the drum 2, the followng moments are exerted on the flyweight 4:

$$M = \{F_c(\alpha) \cdot l_c\} + F_t(\epsilon)l_t - \{F_r l_r\}$$

The moment $M_f$ causing the acceleration of the rotating part 6.1 does not stop on contact between the friction linings 5 and the wall 2 but induce a force $F_N$, $F_N = f(M_f)$.

The moments exerting an influence on the flyweight 4 are:

$$\{F_r l_r\} + \{F_N(M_f) \cdot l_e \cdot \sin \alpha\} = \{F_N(M_f) \cdot l_e \cos \alpha\}$$

When $\alpha 23\,1 = \text{arc tg } \mu$, then the frictional connection becomes self-closing and geometrical dimensions should be chosen accordingly.

The corresponding requirement for the jamming of the FIGS. 4 and 5 embodiment are:

$$\alpha = \text{arc tg } \mu.$$

In the above calculations:
- $l_c$: the distance between the influence line of the centrifugal force and the fulcrum of the flyweight;
- $l_r$: the distance between the influence line of the spring force and the fulcrum of the flyweight;
- $l_e$: the distance between the point where the jamming force acts and the fulcrum of the flyweight;
- $r_e$: radius of braking;
- $r_s$: radius of the center of gravity of the flyweight;
- s: center of gravity of the flyweight;
- $F_c$: centrifugal force;

$l_f$: the distance between the resultant of the tangential inertia forces and the fulcrum of the flyweight;
$\epsilon$: acceleration of the rotating part;
$F_f$: the resultant of the tangential inertia forces;
$F_s$: frictional force;
$F_r$: spring force;
$\alpha$: angle of connection;
$\omega$: angular velocity of the rotating part;
$\mu$ coefficient of friction;
m: the mass of one flyweight; $M_f$: moment accelerating the rotating part.

We claim:

1. A spinning-type fishing reel comprising:
a support which can be mounted on a fishing rod;
a rotor mounted on said support and rotatable about an axis, said rotor provided with a line-guide member including a bail which can be swung between a casting position and a line takeup position;
a spool mounted on said support and centered on said axis;
a mechanism including a crank for rotating said rotor when said bail is swung into said line takeup position for winding a line on said spool;
a drum fixedly mounted on said support and centered on said axis;
a circular plate mounted on said rotor and disposed coaxially in said drum;
a pair of flyweights pivotally mounted on said circular plate by respective pivots diametrically opposite one another, each flyweight being provided with a friction surface at one side of said respective pivot thereof and engageable with said drum under the influence of centrifugal force and inertia when said rotor is rotated in one direction with a critical combination of angular velocity and angular acceleration;
a pair of detents mounted on said circular plate diametrically opposite one another; and
a pair of springs mounted at said circular plate diametrically opposite one another, each spring engaging a respective flyweight at another side of said respective pivot thereof for biasing said flyweight away from said drum and against said respective detent associated with said flyweight whereby, upon rotation of said rotor in said one direction by said line in the setting of a hook in a fish at said critical combination of angular velocity and angular acceleration, said flyweights jam against said drum and prevent further rotation of said rotor.

2. The fishing reel defined in claim 1 wherein said friction surface of a respective flyweight is disposed upstream of said pivot thereof and said spring is disposed downstream of said pivot thereof as determined by the rotation of said rotor in said one direction.

3. The fishing reel defined in claim 1 wherein said springs are leaf springs.

4. The fishing reel defined in claim 1 wherein said springs are mounted on said plate.

5. The fishing reel defined in claim 1 wherein said springs are mounted on respective selector arms mounted on said rotor at said plate, said arms being shiftable into a first mode of operation position in which said flyweights are biased by said springs against said respective detents whereby rotation of said rotor in said one direction is limited by said critical combination, and a second mode of operation position in which said flyweights are biased by said springs against said drum whereby rotation of said rotor in said one direction is completely prevented.

6. The fishing reel defined in claim 5 wherein said selector arms are maintained in a respective mode of operation position by indexing means provided on said rotor and acting on said selector arms.

7. A spinning-type fishing reel comprising:
a support which can be mounted on a fishing rod;
a rotor mounted on said support and rotatable about an axis, said rotor being provided with a line-guide member including a bail which can be swung between a casting position and a line takeup position;
a spool mounted on said support and centered on said axis;
a mechanism including a crank for rotating said rotor when said bail is swung into said line takeup position for winding a line on said spool;
a drum fixedly mounted on said support and centered on said axis;
a circular plate mounted on said rotor and disposed coaxially in said drum;
a pair of keyways formed in said plate diametrically opposite one another at a circumference thereof and each formed with an edge tapering outwardly toward said drum; and
a respective flyweight disposed in each keyway and mounted at said plate by a respective spring biasing said flyweight away from said drum whereby, upon rotation of said rotor in one direction by said line in the setting of a hook in a fish at a critical combination of angular velocity and angular acceleration, each flyweight, under the influence of centrifugal force and inertia, becomes jammed between said edge of a respective keyway and said drum and prevents further rotation of said rotor.

8. The fishing reel defined in claim 7 wherein said tapering edge of each keyway is disposed downstream of a respective flyweight as determined by the rotation of said rotor in said one direction.

9. The fishing reel defined in claim 7 wherein said springs are leaf springs.

10. The fishing reel defined in claim 7 wherein said springs are mounted on said plate.

11. The fishing reel defined in claim 7 wherein said springs are mounted on respective selector arms mounted on said rotor at said plate, said arms being shiftable into a first mode of operation position in which said flyweights are biased by said springs away from said drum whereby rotation of said rotor in said one direction is limited by said critical combination, and a second mode of operation position in which said flyweights are biased by said springs against said drum whereby rotation of said rotor in said one direction is completely prevented.

12. The fishing reel defined in claim 11 wherein said selector arms are maintained in a respective mode of operation position by indexing means provided on said rotor and acting on said selector arms.

* * * * *